(No Model.) 2 Sheets—Sheet 1.
H. C. LOWRIE.
PERMUTATION PADLOCK.
No. 502,307. Patented Aug. 1, 1893.
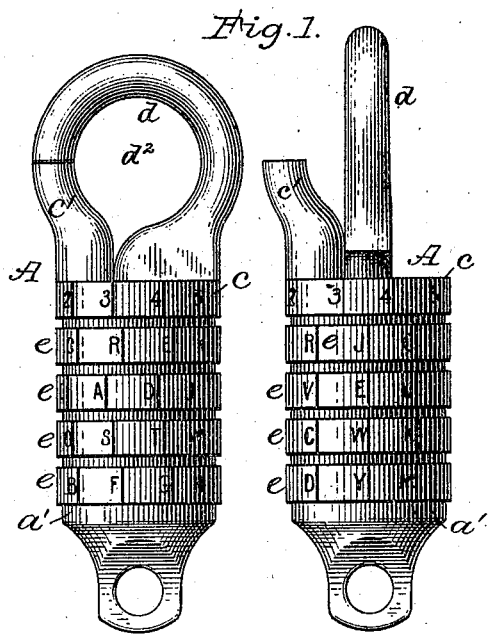
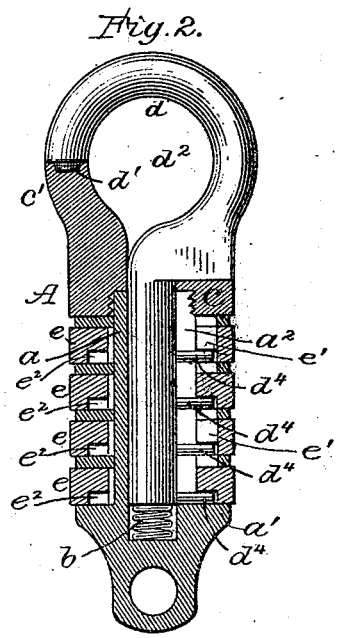
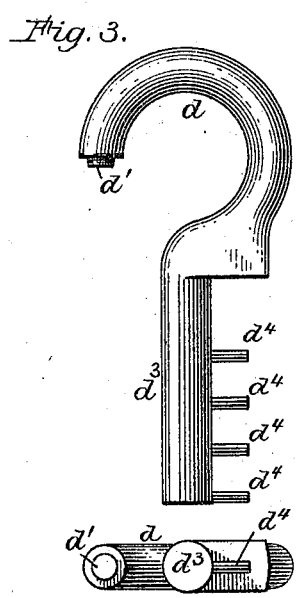
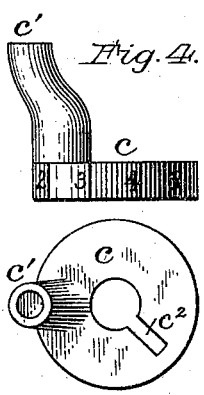
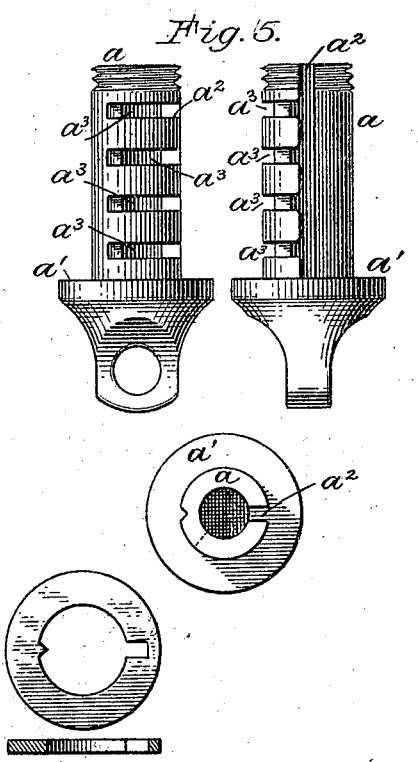
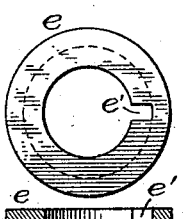
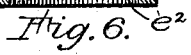
Attest:
Philip F. Larner
Howell Bartle
Inventor:
Harvey C. Lowrie
By his Attorney (No Model.) 2 Sheets—Sheet 2.
H. C. LOWRIE.
PERMUTATION PADLOCK.
No. 502,307. Patented Aug. 1, 1893.
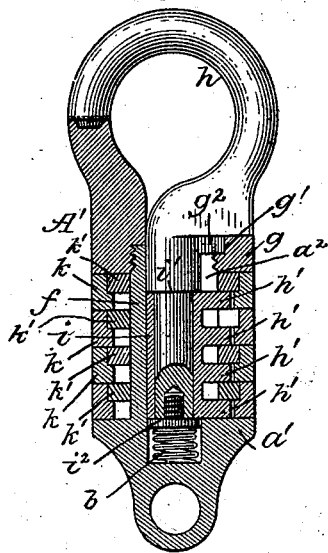
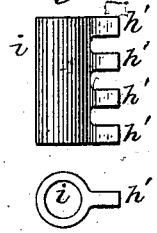
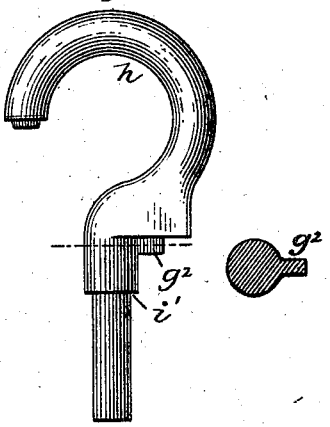
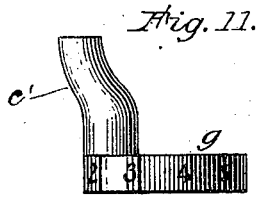
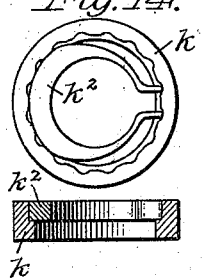
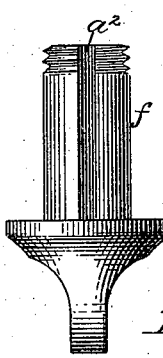
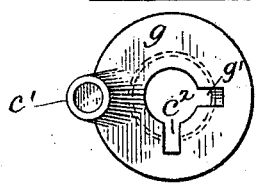
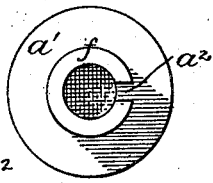
Attest:
Philip F. Larner
Nowell Bartle
Inventor:
Harvey C. Lowrie
By McC Nna
Attorney

UNITED STATES PATENT OFFICE.

HARVEY C. LOWRIE, OF DENVER, COLORADO.

PERMUTATION-PADLOCK.

SPECIFICATION forming part of Letters Patent No. 502,307, dated August 1, 1893.

Application filed September 29, 1892. Serial No. 447,327. (No model.)

*To all whom it may concern:*

Be it known that I, HARVEY C. LOWRIE, of Denver, in the county of Arapahoe, in the State of Colorado, have invented certain new and useful Improvements in Permutation-Padlocks; and I do hereby declare that the following specification, taken in connection with the drawings furnished and forming a part of the same, is a clear, true, and complete description of my invention.

The object of my invention is the production of strong, effective, and readily operated permutation padlocks which are symmetrical in appearance, compact, simple and comparatively inexpensive in the construction and ready assemblage of its parts, and to such end I have so constructed and organized the cap plate of the lock that a horn thereon, co-operates as a stationary portion of a hasp, with the main hasp in affording a liberal central opening or eye for receiving links of chains, or staples of considerable size in cross section. I have also provided for a longitudinal and rotative movement of the hasp for affording an extensive opening between it and the co-operating cap. I have also provided a central tube which is longitudinally slotted for the reception of locking lugs carried by the slidable and rotative shank of the hasp, said sleeve serving as the axial support for the several appropriately marked working rings which control the locking lugs in their relations with respect of the longitudinal slot in the tube, for permitting the shank to be moved longitudinally and rotatively. With respect of the rotative movement of the hasp I have provided therefor, either by the rotation of the locking lugs with the shank of the hasp, or by the non rotation of said lugs; this latter involving the use of a sleeve provided with lugs, and within which the shank of the hasp may be freely rotated after a proper longitudinal movement of the hasp and its sleeve, the central tube in this case being only slotted longitudinally, and in the other case also slotted laterally for the reception of the locking lugs, which are fixedly carried by the shank of the rotative hasp. I have also introduced between the inner end of the cylindrical shank of the hasp, and the bottom of the central tube, an ejecting spring, which promptly imparts to the hasp its longitudinal movement as soon as the working rings have been properly registered, thus obviating the necessity of pulling upon the hasp as heretofore, with an incident liability of deranging the unlocking positions of the working rings. I have also provided the working rings with inner open or notched rings, which frictionally engage with the outer rings, with such tenacity as to enable the two rings to securely operate as one ring, but which nevertheless enable combinations to be changed without taking the lock apart.

To more particularly describe my invention I will refer to the accompanying drawings, and after a detailed description of locks embodying all and portions of my invention, the several features deemed novel will be duly specified in appropriate clauses of claim hereunto annexed.

Figure 1, illustrates one of my locks in two side views, with hasp closed and open. Fig. 2, is a longitudinal central section of the same. Fig. 3, in side and bottom or end views illustrates the hasp detached. Fig. 4, in side and top views illustrates the cap or top plate of the lock. Fig. 5, in two side views and top view, illustrates the central tube of the lock and its base. Fig. 6, in top view and section illustrates one of the working rings. Fig. 7, illustrates in top and edge views, one of the non rotative parting plates or washers, which are located between the rotative working rings. Fig. 8, in longitudinal central section, illustrates one of my locks of a more complex form, but which contains many of the features embodied in the lock, Fig. 1. Fig. 9, in side and top views, illustrates a rotatively loose sleeve carried by the hasp shank, and provided with locking lugs. Fig. 10, is a side view of the hasp detached, with a cross section of the upper portion of its shank. Fig. 11, is a side and top view of the cap plate. Fig. 12, illustrates in top view and section one of the working rings, with its interior adjustable notched ring, the two constituting a working ring. Fig. 13, in side and top views illustrates the central tube and its base. Fig. 14, in top view and section illustrates a novel working ring, embodying an inner ring which frictionally engages with the outer ring.

I will first describe the lock A of Figs. 1 to 7 inclusive, that being the simpler of the two locks shown. The foundation of the lock is the central tube $a$, having a base or bottom plate $a'$, a longitudinal slot $a^2$ extending from the top to the base, and a series of lateral slots $a^3$ which communicate with the slot $a^2$. At the bottom of this tube there is a spiral spring $b$, which serves as a hasp projector whenever permitted so to operate. The other end of the tube is surmounted by a cap plate $c$, which is screwed or otherwise fastened to the tube, and is provided with a hasp horn $c'$ at the one side thereof, said horn being mortised at its end or top to serve as a hasp socket. This horn also operates as a stationary portion of a hasp because it extends from the cap longitudinally and serves as one side of the lower part of the shackling eye of the lock. At its inner side the cap plate is slotted from top to bottom as at $c^2$ for the passage of lugs on the hasp shank when assembling the several parts, said slot $c^2$ not registering with the slot $a^2$ in the central tube, after the cap plate has been secured to the tube. The periphery of the cap plate is appropriately marked with letters, or with figures as shown. The hasp $d$ is hook shaped at its head, and tenoned as at $d'$ for entering the socket of the horn $c'$. When in that position a large shackling space or eye, as at $d^2$, is afforded. The shank $d^3$ of the hask is solid and cylindrical, and is provided at one side in a straight line, with several (four) laterally projecting locking lugs $d^4, d^4, d^4, d^4$, these lugs corresponding in number with the working rings to be employed therewith. These lugs may be integral with the shank, but preferably strong plugs or pins inserted in drilled holes. The working rings $e$ in this instance are four in number to correspond with the lugs $d^4$, and said rings are substantial counterparts as to structure, in that each has on its inner side a notch $e'$ of such dimensions as will enable it to readily receive the outer end of its appropriate lug $d^4$, and it is also annularly recessed, as at $e^2$, from one side of the ring, to a depth equal to the lateral depth of the notch $e'$, so as to also receive freely the outer end of a lug $d^4$. The periphery of each ring is appropriately marked as with numerals or with letters as shown, but the letters or numerals opposite the notches $e'$ are varied.

In assembling the parts the several working rings $e$ with their recesses $e^2$ downward are placed on the central tube, and the slot $a^2$ therein made to register with the several notches $e'$ of the rings; the cap plate is then put on, and when its notch or slot $c^2$ registers with the slot $a^2$, the shank of the hasp is inserted with its locking lugs $d^4$ entering the slot and the then registering notches of the rings, and then the cap is turned up on its screw tightly, its notch then being at the one side of the slot $a^2$, and confining the hasp to the body of the lock, after which the several rings are turned, so that the outer ends of the locking lugs will then occupy the slot $a^2$ in the tube, and also the annular recesses $e^2$ of the rings. Assuming that this lock was set on 6 J E W Y, and that these marks were in line, then each ring will release its appropriate lug, and the spring $b$ will project the hasp enough to release its tenon $d'$ from its socket, and leave the hasp free to be rotated, the several locking lugs $d^4$ then freely entering their appropriate lateral slot $a^3$, in the central tube, thus widely opening the shackling eye for the reception of a large chain link or links, or a staple.

Certain of the novel features thus far described have been embodied by me in locks differing in their interior construction, as, for instance, as shown in Figs. 8 to 12. In this lock A' the foundation of the structure is the central tube $f$ which differs from the tube $a$ only in having no lateral slots, but its longitudinal slot $a^2$ is the same, as the other. The base plate $a'$ is also as in the other lock, but the cap plate $g$ differs from that in the other lock in having a notch $g'$ which is always occupied by a lug on the hasp, when the latter is closed. This cap plate has a mortised horn $c'$, as before described. The hasp $h$ of this lock has at the top of its shank, a lug $g^2$ for entering the notch $g'$ in the cap plate, and it also carries locking lugs, but the latter are integral projections or studs $h'$ on a sleeve $i$, which is loosely journaled on the cylindrical shank of the hasp, which has a shoulder at $i'$, and a screw $i^2$, at its end, so that the sleeve is confined longitudinally between said shoulder and the head of the screw, while the shank can freely rotate within the tube $f$ and also within said sleeve. The locking lugs $h'$ always occupy the longitudinal slot $a^2$, and the inner end of the shank of the hasp, as in the other lock, abuts upon a spring $b$, which, as before, operates as a hasp projector when permitted.

The working rings in this lock are appropriately marked on their peripheries, but they are complex in that each comprises an outer ring $k$, and an inner ring $k'$. Each outer ring $k$ is annularly recessed from one side to about one-half of its thickness for the reception of its inner ring $k'$, the latter being only about one-half as thick as the outer ring, as is clearly indicated in Fig. 12. This inner ring has a notch $e'$ of such dimensions as enable it to register with the slot $a^2$ in the tube, and to thereby receive its appropriate locking lug $h'$, the two rings considered as one, affording an annular recess at $e^2$ as with the rings first described. With these inner rings, however, more numerous changes in the opening combinations are afforded, as is common with double rings in locks of this general class. With the inner rings thus locked to the outer rings as heretofore, the lock must be taken apart for changing permutation, and to avoid this I have devised inner rings which frictionally engage with the outer rings, firmly enough to prevent derangement in position, under ordinary circumstances, but so as to enable permutation changes to be made by forcibly turning the outer rings while the hasp is in a projected position. This feature is illustrated in Fig. 14. This complex working ring includes an outer ring as in Fig. 12, but this inner ring $k^2$ is an expansive ring, composed of resilient metal, and so formed that it must be forcibly sprung into its seat in the outer ring, and reliance may be had upon its adhesion to an outer ring having a plain inner surface, although it is preferable that said surface should be more or less serrated for increasing frictional contact. With a working ring so constructed, there is little or no liability of deranging the permutation in the ordinary use of the lock, but when the hasp is projected, the outer ring may be rotated if heavily forced. In both of the locks described, the hasps are slidable and rotative, are projected by a spring when released by the working rings, co-operate with cap plates having mortised lugs, and have shanks which are cylindrical, occupy the center of the body of the lock, and both carry locking lugs either integrally or by way of a sleeve attached to the shank. So also both locks have central tubes which are slotted longitudinally and have cap plates and bases between which the working rings are confined while free to axially rotate on said tube.

Having thus described my invention, I claim as new and desire to secure by Letters Patent—

1. In a permutation padlock, the combination substantially as hereinbefore described, of a series of appropriately marked working rings; a central longitudinally slotted tube, concentric with said rings and serving as their axial support; a base section at one end of said tube; a cap secured to the other end of the tube, and having a projecting horn; a hasp which engages in locking contact with said horn, and has a shank which occupies said central tube and is slidable and rotative therein, and locking lugs or pins which are carried by said hasp shank and are controlled with respect of their relations to the longitudinal slot in the central tube, by said working rings.

2. In a permutation padlock, the combination substantially as hereinbefore described, of a series of appropriately marked working rings; a central longitudinally and laterally slotted tube concentric with said rings and serving as their axial support; and a hasp having a shank which is rotative and slidable within said tube, and provided with lugs which with relation to the slots in the tube are controlled by the working rings.

3. In a permutation padlock, the combination substantially as hereinbefore described, of the working rings; a central tube on which said rings are rotatively mounted and secured; a slidable and rotative hasp having a cylindrical shank and provided with laterally projecting locking lugs, and an ejecting spring between the end of the shank and the bottom of the tube.

4. In a permutation padlock, a complex working ring consisting of an outer ring, and an inner ring, engaging with the outer ring under heavy friction, substantially as described, whereby said two rings will normally operate as one, but which while the hasp of the lock is projected, will enable the outer ring to be forcibly rotated for changing permutation without taking the lock apart.

HARVEY C. LOWRIE.

Witnesses:
JOHN H. PULLEN,
CHARLES H. VOORHIES, Jr.